United States Patent
Girard

(10) Patent No.: US 7,106,572 B1
(45) Date of Patent: Sep. 12, 2006

(54) DEVICE FOR PROTECTING AGAINST VOLTAGE SURGES

(75) Inventor: François Girard, Dijon (FR)

(73) Assignee: Adee Electronic (Societe a Responsabilite Limitee), Pont de Pany (FR)

(*) Notice: Subject to any disclaimer, the term of this patent is extended or adjusted under 35 U.S.C. 154(b) by 226 days.

(21) Appl. No.: 10/088,022

(22) PCT Filed: Sep. 15, 2000

(86) PCT No.: PCT/FR00/02574

§ 371 (c)(1),
(2), (4) Date: Jul. 3, 2002

(87) PCT Pub. No.: WO01/22551

PCT Pub. Date: Mar. 29, 2001

(30) Foreign Application Priority Data

Sep. 17, 1999 (FR) .................................. 99 11656

(51) Int. Cl.
*H02H 1/00* (2006.01)
(52) U.S. Cl. .................................................... 361/118
(58) Field of Classification Search ................. 361/56, 361/111, 118
See application file for complete search history.

(56) References Cited

U.S. PATENT DOCUMENTS

| | | | | |
|---|---|---|---|---|
| 4,023,071 A | * | 5/1977 | Fussell .......................... 361/56 |
| 4,646,037 A | * | 2/1987 | Turolla et al. ............... 333/182 |
| 4,703,299 A | * | 10/1987 | Vermij ........................ 337/158 |
| 4,807,083 A | * | 2/1989 | Austin ......................... 361/111 |
| 4,901,183 A | * | 2/1990 | Lee ............................... 361/56 |
| 5,198,791 A | | 3/1993 | Shibayama et al. ........... 337/31 |
| 5,831,808 A | * | 11/1998 | Girard ......................... 361/118 |
| 6,657,843 B1 | * | 12/2003 | Girard ......................... 361/118 |

FOREIGN PATENT DOCUMENTS

| | | |
|---|---|---|
| DE | 298 08 365 | 7/1998 |
| FR | 2 585 892 | 2/1987 |
| WO | WO 83/00586 | 2/1983 |
| WO | WO 90/02431 | 3/1990 |
| WO | WO 93/21678 | 10/1993 |

* cited by examiner

*Primary Examiner*—Brian Sircus
*Assistant Examiner*—Boris Benenson
(74) *Attorney, Agent, or Firm*—Young & Thompson

(57) ABSTRACT

A device for protection against voltage surges in an electric power supply line includes at least two elements (1', 3), namely a Zener diode lightning arrester (1') fast-blow in short circuit, and a varistor (3), arranged in parallel. One of the terminals common to the two elements (1', 3) is connected to the line to be protected, and the other common terminal is connected to earth or to a common conductor element.

2 Claims, 1 Drawing Sheet

DEVICE FOR PROTECTING AGAINST VOLTAGE SURGES

BACKGROUND OF THE INVENTION

The present invention relates to a device intended to ensure protection of electrical apparatus against voltage surges which sometimes occur on the conductors used in electric energy distribution networks, particularly in the event of lightning striking.

The prior state of the art has proposed a very diverse quantity of lightning arrester devices which are connected between a wire of the network and earth or a common conductor element, and which comprise components which, in normal functioning, act like neutral elements but which, in the event of violent voltage surge, become conducting so that they divert the current due to the voltage surge and in particular to the lightning, thus protecting the installation disposed downstream against the destructive effects of such voltage surge.

The technical characteristics which are required of such apparatus are very varied, with the result that, up to the present time, no lightning arrester device on the market totally satisfies all the necessary characteristics:

The latter are the following:
very short response time,
very great power of flow of the current,
very low residual voltage,
continuity of the service, and of the protection,
cost price having to be able to be determined as a function of the cost of the apparatus and of the devices to be protected.

In order to perform such a function, it has been proposed to use gas discharge arresters. However, these latter possess noteworthy drawbacks and in particular that of presenting a considerable delay at ignition so that, in certain cases, and especially in the case of particularly violent and rapid voltage surges provoked by lightning, the electronic apparatus deteriorate before the lightning current is diverted by the discharge arrester.

Varistors have also been employed which present the advantage of absorbing considerable thermic and electric energies without being destroyed, when they are subjected to current impulsions, so that they thus make it possible to peak-clip a voltage surge, particularly provoked by lightning, without the supply of current of the apparatus that the device intends to protect being interrupted. An example of a characteristic of varistor is represented in FIG. 1 (curve b).

However, it is generally known that a lightning arrester is a device which is connected between a line to be protected and earth or a common conductor element, and which becomes conducting when a transitory voltage surge occurs and which, by flowing off the energy therefrom, protects the sensitive electronic equipment disposed downstream, against the destructive effects of this voltage surge. It is thus understood that a lightning arrester of ideal type must not conduct the electric current when the voltage at its terminals is normal and must rapidly conduct a large quantity of current when the voltage becomes abnormal, while maintaining the voltage surge at an acceptable level.

Now, the principal drawback of varistors is that, under the effect of repeated electric shocks, and by reason of the high operational temperatures, they are subjected to wear which is translated by a resistive fast-blow by lowering of the peak-clipping threshold. One is thus obliged to introduce disconnectors (standard NFC 61-740 July 1995 and standard CEI 61653-1 of Mar. 1, 1998) in the energy lines, whose purpose is to open the circuit in the case of fast-blow in order to avoid a fire being started. One of the disconnectors used is obligatorily disposed inside the body of the lightning arrester, which brings about elimination of the protection as soon as it is actuated.

Such a mode of operation is extremely risky at the level of protection of an installation insofar as, during a storm, the voltage surges follow one another at a certain rhythm depending on the different thunder claps. Various means intended to overcome this drawback have therefore been proposed, particularly by disposing a plurality of varistors in parallel, which is possible thanks to the importance of the slope (U/I ratio) of their characteristic. Such a placing in parallel may be effected with the aid of varistors of different values, which makes it possible to monitor, to a certain extent, the order of their destruction.

It is also known that another drawback of the varistors is that they present too high a residual voltage in the case of a very rapid voltage front and in the case of very strong currents.

Lightning arrester devices have also been proposed, employing Zener diodes which present the advantage of not being influenced by wear due to repeated electric shocks and of operating at high temperatures. These lightning arresters are such that, once the Zener diode is destroyed due to a voltage surge, they immediately become conducting, with the result that they conduct the voltage surge to earth. In that case they present a considerable capacity of flow of the currents and very weak residual voltages, and this in all cases.

Unfortunately, lightning arresters of this type present the drawback of being of a high cost, insofar as the Zener diodes used are constructed from monocrystalline silicon which is much more expensive than the products used for producing the varistors and which must be disposed between heat-dissipating discs made of copper or silver. Such lightning arresters must therefore be constructed with a large number of discs which is a function of the magnitude of the energy that it is desired to absorb before destruction of the element in short-circuit.

Nonetheless, despite their cost, such lightning arresters are, however, interesting, since, after they are destroyed, they ensure a continuity of the protection of the apparatus that they are intended to protect.

Patent DE-U-298 08 365 also discloses a high voltage protection circuit intended to protect low input impedance measuring devices making it possible to avoid different problems which are encountered on the conventional circuits and in particular current loss effects during high-precision measurements.

This circuit, whose purpose is different from the one forming the subject matter of the present application, comprises a varistor and a Zener diode which are associated. However, the terminals of these two elements are not common and the circuit can therefore not perform the function of the circuit according to the invention.

SUMMARY OF THE INVENTION

The present invention has for its object to overcome the various drawbacks of the prior art by proposing a device for protection against voltage surges, and particularly against the effects of lightning, which satisfies all of the different conditions envisaged hereinabove.

The present invention thus has for its object a device for protection against voltage surges in an electric power supply line, characterized in that it comprises at least two elements, namely at least a Zener diode lightning arrestor of the fast-blow in short circuit type (the arrestor forms a short circuit when the arrestor has blown), and a varistor, whose terminals are common and which are arranged in parallel, one of the terminals common to these two elements being connected to the line to be protected, and the other common terminal being connected to earth or to a common conductor element.

The varistor element may be associated with a disconnector which will be disposed between it and the line to be protected. Furthermore, a disconnector may be disposed upstream of that common terminal of the two elements which is connected to the line to be protected.

In a particularly interesting form of embodiment of the invention, the device will be constituted by an envelope of substantially cylindrical shape, of which the two ends will be formed by two metal rings insulated from each other, which will constitute its two terminals, each of them being respectively joined to said common terminals of the two elements. The Zener diode lightning arrester will preferably be disposed along the longitudinal axis of the cylindrical envelope. The varistor element will take the shape of a tube which will be disposed around the Zener diode lightning arrester element, so that its longitudinal axis merges with the longitudinal axis of the cylindrical envelope. Furthermore, the inner and outer surfaces of the varistor element may be respectively in contact with an inner metal tube and an outer metal tube which will form its electrodes and which will be respectively in contact with the metal rings.

Interestingly, the connection between the metal ring and the outer tube is ensured by welding spots whose volume and number are such that they are adapted to melt under the effect of a voltage surge so as to perform a function of disconnector.

The interior space of the inner tube may be filled with an insulating, resistant product such as in particular an epoxy resin.

The protection device according to the invention may also be constituted by a connector support which comprises means for respectively receiving the elements which ensures their connection in parallel as well as the connection of their respective common terminals with the terminals of the device.

DESCRIPTION OF THE PREFERRED EMBODIMENTS

Figure 2:
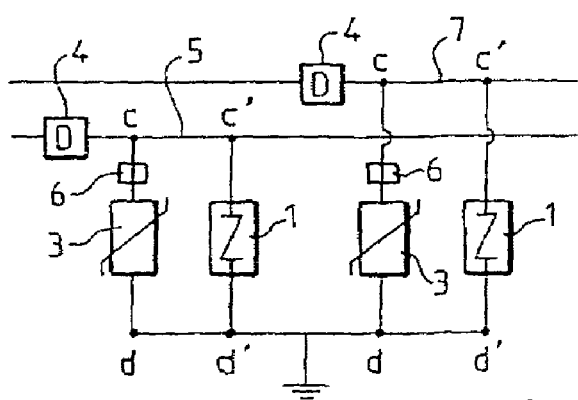
FIG. 2 is a diagram showing a protection device according to the invention and its practical arrangement on a current line to be protected.

As shown in FIG. 2, two lightning arrester elements have been associated in parallel, namely a Zener diode lightning arrester element 1 of the type in which a short circuit is established between its terminals when a certain level of voltage surge is attained, and a varistor 3, so that their respective terminals c and c', on the one hand, and d and d', on the other hand, are common.

The lightning arrester is intended to ensure protection of an electric line 5. To that end, one of the common terminals c, c' of the two lightning arrester elements 1 and 3 is connected to line 5 and their other common terminal d, d' is connected to earth. A disconnector 4 is disposed on the line 5 upstream of the lightning arrester elements 1 and 3 and another disconnector 6 is disposed just upstream of the varistor 3. The other line 7 of the installation may be protected in the same way.

Figure 1:
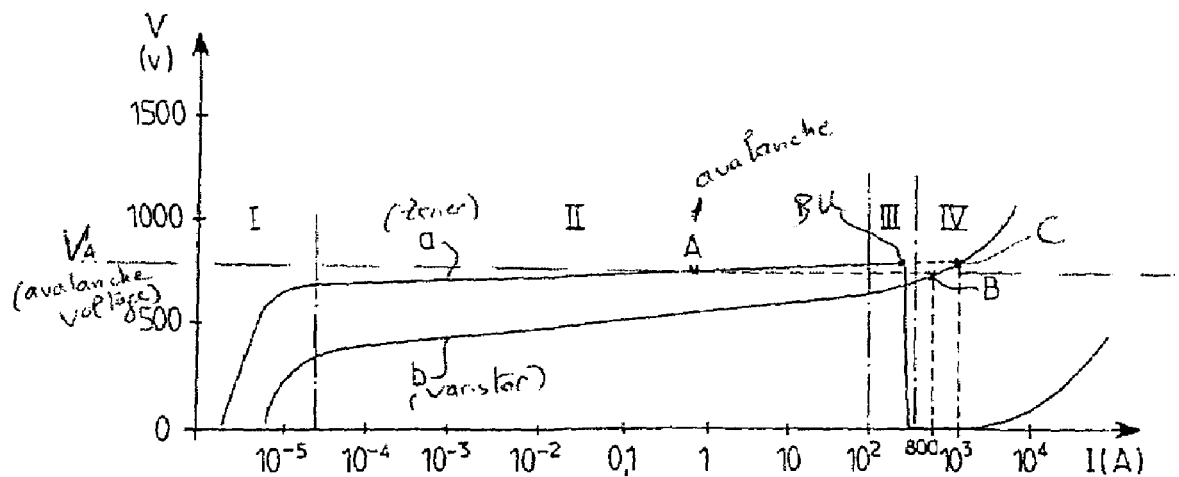
FIG. 1 is a graph representing the characteristics (i.e. the variation of the voltage as a function of the current), on the one hand, of a lightning arrester of the type incorporating Zener diode (curve a) and, on the other hand, of a varistor (curve b).

FIG. 1 shows the respective characteristics a and b of the two lightning arrester elements 1 and 3, i.e. the variation of the voltage V at the terminals of an element as a function of the intensity I of the current which traverses it. In this way, four zones I, II, III, IV can be distinguished, as a function of the value of the current.

Concerning element 1, which is the lightning arrester comprising a Zener diode, it is observed that: in the first zone I, a very weak current is established and corresponds to the polarization of the Zener diode. In the second zone II, which corresponds to a so-called avalanche zone, the voltage is almost constant whatever the current which traverses the lightning arrester. In the third zone III, the electric power established, which corresponds to the product of the voltage maintained by the current, generates, within the lightning arrester, considerable heat which provokes fusion of the elements and which gives the assembly a very low definitive electric resistance. In the fourth zone IV, the resistance having become very weak, the voltage at the terminals of the lightning arrester rises little despite the very high currents. It is known that the process of peak-clipping which is effected in zones I and II is a process of reversible nature creating no wear and no change of the characteristics of the lightning arrester. Inversely, in zone III, there is a sudden and irreversible change of the characteristics.

As shown in the same FIG. 1, the corresponding characteristic of element 3, namely the varistor, lies beneath that of the lightning arrester element 1, so that, when the two lightning arrester elements are associated in parallel and their respective connection terminals are common and they are consequently supplied at their ends by the same voltage, it is the element 3 constituted by the varistor which ensures the delivery of the current (since for a voltage of about 500 volts at the terminals of these two elements the varistor 3 will deliver a current with an intensity of the order of 0.05 milliamperes while the current delivered in the lightning arrester will be of the order of about 5 microamperes). The association in parallel, with common terminals, of the varistor 3 and of the lightning arrester 1 essentially constituted by a Zener diode, will make it possible, when the voltage at the terminals of the varistor attains the avalanche value of the Zener diode, to continue to conduct the current until the blow-out power of the Zener diode is attained, which will be produced for a current value much higher than what it would have been without the association of the varistor.

Figure 3:
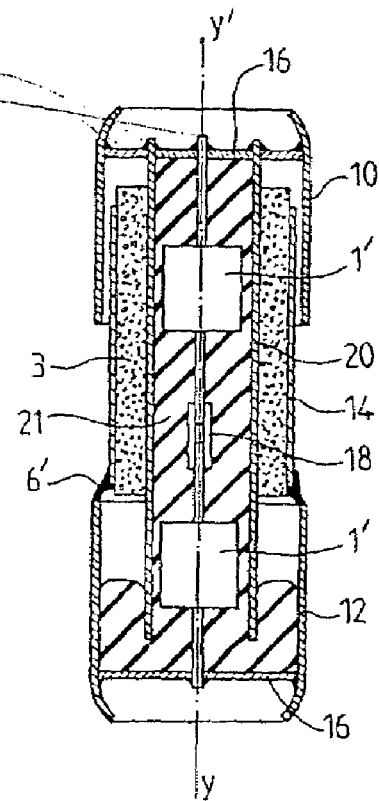
FIG. 3 is a view in axial and longitudinal section of a form of embodiment of a protection device according to the invention.

FIG. 3 shows a practical example of implementation of a lightning arrester device. This lightning arrester device is of substantially cylindrical shape, with longitudinal axis yy'. It comprises two metal end rings 10 and 12 which constitute the two connection terminals of the lightning arrester. One of these rings, the lower ring 12 in the drawing, is connected by welding of a metal tube 14 of smaller diameter. Each of the two metal rings 10, 12 receives, in a zone close to its end, a metal disc 16 with which it is connected by welding. There have been arranged along the longitudinal axis yy' of the device, two Zener diode lightning arrester elements 1' of the fast-blow in short circuit type. These two elements 1' are arranged in series and are connected by a tubular metal join 18 so that their end terminals are respectively welded to the discs 16 at the centre thereof. The two Zener diode lightning arrester elements 1' are of the type in which, under the effect of a very high power, they short circuit definitively. Such lightning arresters are in particular of the type such as those described in Patents FR-A-2 511 556 and FR-A-2 585 892.

The two lightning arrester elements 1' are surrounded by a metallic tubular element 20 which is welded to one of these ends on the upper disc 16 and which constitutes an armour intended to give it a sufficient mechanical strength to allow it to withstand the high powers which are generated by the currents developed by the phenomenon of lightning, and this for a sufficient time allowing the possible disconnector devices to be activated.

The varistor 3 has a tubular shape and its inner face is in contact with the inner tube 20 which thus constitutes one of its electrodes and its outer face is in contact with the outer tube 14 which constitutes its other electrode. This tube 14 is joined to the ring 12 by welding.

In this particular form of embodiment of the invention, the welding which joins the ring 12 to the tube 14 may be made to perform the role of disconnector 6, i.e. it melts in the event of a voltage surge. To that end, this weld 6' may be a solder of which the volume will be determined so as to provoke its fusion under specific conditions. In particular, it may be constituted by a series of spots distributed on the periphery of the join of the ring 12 and of the tube 14.

The inner volume of the tube 20, as well as that defined by the inner walls of the ring 12, are filled with a resin 21, for example a thermosetting or epoxy resin. This resin is chosen, on the one hand, for its qualities of insulator but also, on the other hand, for its qualities of adherence with the case elements with which it is in contact as well as for its inherent qualities of mechanical resistance.

The device according to the invention for protecting against voltage surges may, of course, be constituted with another structure.

Figure 4:
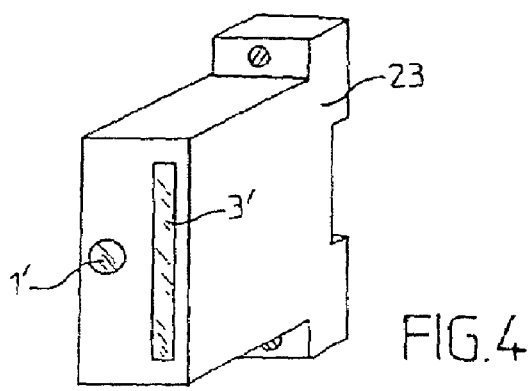
FIG. 4 is a view in perspective of a second variant embodiment of a protection device according to the invention.

As shown in FIG. 4, the protection device comprises a modular embeddable case 23, of the standardized type, comprising a first cylindrical housing allowing it to receive a Zener diode lightning arrester element 1' of substantially cylindrical shape and a second housing of parallelepipedic shape allowing it to receive a varistor 3' of the same shape. The case 23 comprises inner connection means making it possible to place the two lightning arrester elements 1' and 3' in parallel and to ensure the connection of their respective common terminals with the terminals of the device, as well as a disconnector associated with the varistor.

The invention claimed is:

1. A device for protection against voltage surges in an electric power supply line, comprising:
    a Zener diode lightning arrestor that irreversibly short circuits to substantially zero volts and thereafter carries a discharge current that is substantially higher than before short circuiting;
    a varistor whose voltage-current curve is below a corresponding voltage-current curve of said arrestor until a certain current is reached at which the voltage-current curve of said varistor is above the voltage-current curve of said arrestor causing said arrestor to irreversibly short circuit, said certain current being greater than a current at which said arrestor would short circuit if said varistor were not present;
    the arrestor and varistor having respective connection terminals that are common and arranged in parallel, one of the connection terminals being connected to a line to be protected and the other connection terminal being connected to one of earth and a common conductor element; and
    an envelope of substantially cylindrical shape having two ends that are metal rings insulated from one another constituting said connection terminals, wherein the varistor has the shape of a tube which is disposed around the Zener diode lightning arrester so that a longitudinal axis of the tube merges with the longitudinal axis of the cylindrical envelope,
    wherein inner and outer surfaces of the varistor are respectively in contact with an inner metal tube and an outer metal tube which form electrodes of the varistor and which are respectively in contact with the metal rings, and
    wherein a connection between one of the metal rings and the outer tube is ensured by welding spots whose volume and number are such that they are adapted to melt under the effect of a voltage surge so as to perform a function of a disconnector.

2. The device according to claim 1, wherein a space inside said inner tube is filled with an insulating and resistant product.

* * * * *